M. Y. & T. J. COPE.
Dumping-Wagon.
No. 18,438.                                    Patented Oct. 20, 1857.
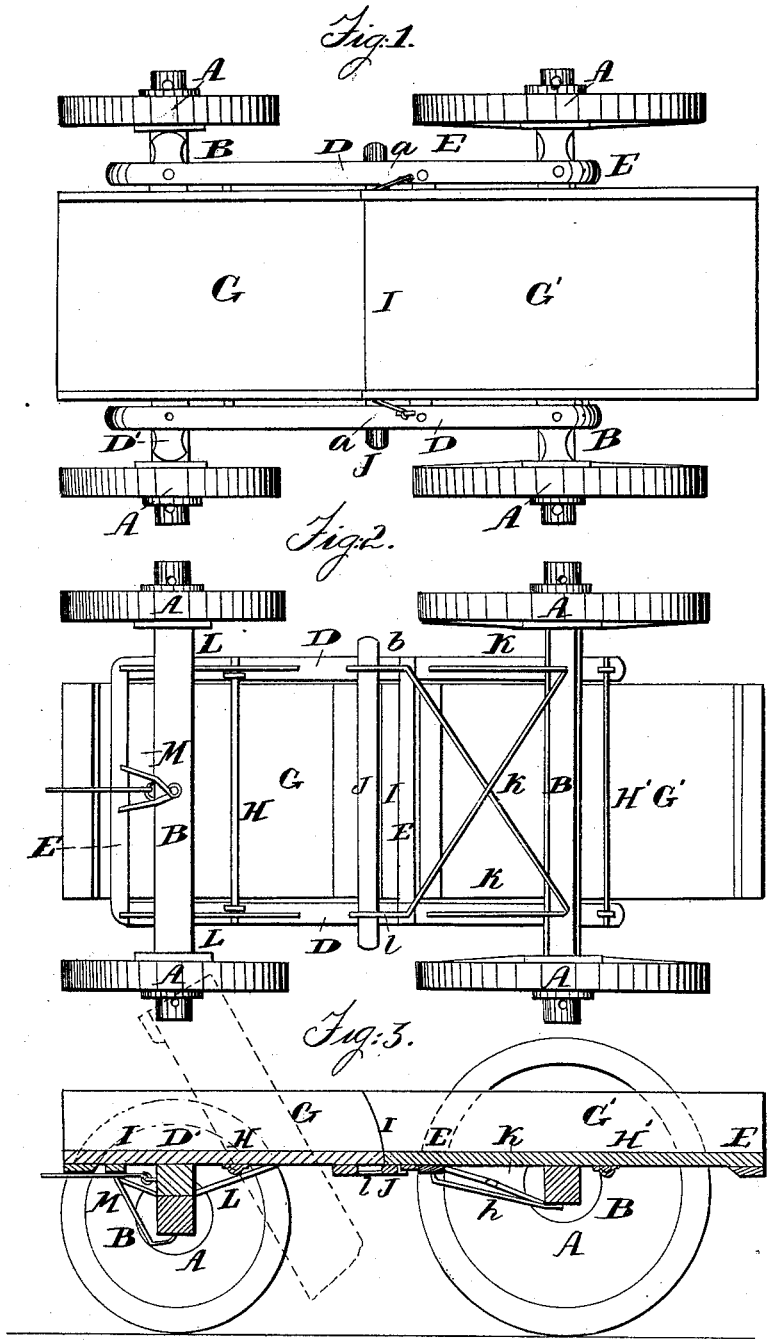

UNITED STATES PATENT OFFICE.

M. Y. COPE AND T. J. COPE, OF CENTER BRIDGE, PENNSYLVANIA.

DUMPING-WAGON.

Specification of Letters Patent No. 18,438, dated October 20, 1857.

*To all whom it may concern:*

Be it known that we, M. Y. COPE and T. J. COPE, of Center Bridge, in the county of Bucks and State of Pennsylvania, have invented a new and Improved Double Dumping Common Road-Wagon; and we do hereby declare that the following is a full, clear, and exact description of the same, reference being had to the accompanying drawings, forming part of this specification, in which—

Figure 1, is a plan or top view. Fig. 2, an inverted plan, and Fig. 3, a vertical longitudinal section of a wagon constructed after our invention.

Similar letters of reference in each of the several figures indicate coresponding parts.

The nature of our invention consists in dividing the body of the wagon transversely, at or near the center of its length, and hinging the sections so that they shall be capable of being tilted independently of each other. A sliding, locking bar and hinged catches being provided to hold the sections in place, and together, at the line of division, and the framing and bracing being so constructed and arranged as to admit of the body being divided as stated and still support it perfectly. This arrangement avoids the necessity of shifting or sliding the body even if made long, independently of the frame when it is desired to dump the load, as the front section can be dumped and the truck then moved forward far enough to bring the rear section in proper position for dumping in like manner as the first, its portion of the load onto that portion dumped by the first section. This arrangement also allows of two different materials being carried in the same wagon and dumped separately at different places, or it allows of one portion of a load being dumped in advance or in rear of the other as may be desirable.

To enable others skilled in the art to make and use our invention we will proceed to describe its construction and operation.

A, A, A, A, represent the wheels and B, B, the axles of a common road wagon.

D, D, are two side bars resting on the sand board D' of the front axle, and fastened permanently to the top of the rear axle. These bars are also connected together at their front extremity, and at the center of their length by transverse stay bars E, E.

On the frame formed by the bars, the body of the wagon is mounted. The section G, being hinged at H, and the section G' being hinged at H'. The line I, of division between the sections is cut obliquely down through the body so that the front section may descend without touching the rear one, and still a perfectly tight joint be formed when the two sections are locked together. The two sections are held up at the point I, where the division is made, by a transverse sliding bar J, and by hinged catches *a, a*. The bar comes underneath the division line, being arranged to slide back and forward in brackets *l, l*, and when under the division line stops the front section from falling or tilting. The catches are hinged to the top of the side bars D, D, and enter holes in the side boards of the rear section, and prevent the rear section from tilting.

K, K, represents the bracing for the rear section, and is attached to the underside of the rear axle and to the transverse and side bars in the manner shown in Figs. 2 and 3. The bracing L, L, of the front section is attached to the side and transverse bars of the frame, and to the sand board of the front axle as shown in Figs. 2 and 3. And the front axle is coupled to the front section of the body by a loop or yoke M, which passes down from the front transverse bar and attaches to the lower end of the king bolt.

From the foregoing description and reference to the drawings it may be evident if the wagon is loaded while in the condition shown in Figs. 1 and 2 neither of the sections will tilt, and that the load consequently can be carried with safety to any desired place. It may also be evident that after the load is transported to the place of destination and the sliding transverse locking bar J, moved to the position shown in Fig. 3, the front section may be as easily dumped as a short cart in the manner ilustrated in red in Fig. 3. And the dumping of one section being effected, by moving the truck forward until the other section comes in proper position for dumping onto the same pile, by withdrawing the catches *a a* said section can be dumped with like ease as the first one was.

We do not claim dumping at the center of the body by dividing the body longitudinally, or furnishing it with a falling hinged bottom, as such arrangements are common, and not useful in common road wagons or carts which require to be used for hauling various objects or materials which necessarily must be dumped from the end of the body, but What we do claim as our invention and desire to secure by Letters Patent, is—

The arrangement, consisting of the hinged divided body G, G', framing D, D, E, bracing K, L, M, sliding locking bar J, and catches a, a, or their equivalents, substantially as and for the purposes herein set forth.

The above specification of our improvement in double-dumping common road wagons subscribed to by us this nineteenth day of August eighteen hundred and fifty seven.

MATHIAS Y. COPE.
THOMAS J. COPE.

Witnesses:
G. Y. AT LEE.
MUNN & Co.